United States Patent
Oda et al.

(10) Patent No.: US 7,645,958 B2
(45) Date of Patent: Jan. 12, 2010

(54) ELECTRIC-DISCHARGE-MACHINING POWER SUPPLY APPARATUS AND SMALL-HOLE ELECTRIC-DISCHARGE MACHINING APPARATUS

(75) Inventors: Kiyohito Oda, Tokyo (JP); Satoshi Suzuki, Tokyo (JP); Kazushi Nakamura, Tokyo (JP); Akihiro Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 395 days.

(21) Appl. No.: 11/631,303

(22) PCT Filed: Oct. 26, 2005

(86) PCT No.: PCT/JP2005/019684
§ 371 (c)(1),
(2), (4) Date: Jan. 3, 2007

(87) PCT Pub. No.: WO2006/046599
PCT Pub. Date: May 4, 2006

(65) Prior Publication Data
US 2008/0017614 A1   Jan. 24, 2008

(30) Foreign Application Priority Data
Oct. 27, 2004   (JP) .............................. 2004-312027

(51) Int. Cl.
*B23H 1/02* (2006.01)
*B23H 7/14* (2006.01)
(52) U.S. Cl. .................................. 219/69.13; 219/69.18
(58) Field of Classification Search .............. 219/69.13, 219/69.18; 323/265, 272, 282
See application file for complete search history.

(56) References Cited

U.S. PATENT DOCUMENTS

| | | | | |
|---|---|---|---|---|
| 5,153,453 A | * | 10/1992 | Walters | 327/502 |
| 5,416,290 A | * | 5/1995 | Magara et al. | 219/69.18 |
| 5,753,882 A | * | 5/1998 | Goto et al. | 219/69.18 |
| 6,113,760 A | * | 9/2000 | Kuriyama et al. | 323/282 |

(Continued)

FOREIGN PATENT DOCUMENTS

JP   43-28875 B1   12/1968

(Continued)

OTHER PUBLICATIONS

Computer translation of Japan Patent No. 6-143,043, performed Mar. 29, 2009.*

*Primary Examiner*—Geoffrey S Evans
(74) *Attorney, Agent, or Firm*—Sughrue Mion, PLLC

(57) ABSTRACT

In order to obtain an electric-discharge-machining power supply apparatus that can flow discharge current pulses through the machining gap uniformly and efficiently, and can realize reduction of the amount of electrode wear in machining in the alternate current pulse system, in an electric-discharge-machining power supply apparatus (2) for applying electric-discharge-machining pulse voltage to a machining gap between a machining electrode (8) and an object (9) to be machined, wherein a circuit (22) composed of a parallel connection of a rectifying element (24) and a resistive element (23) is inserted in series along a wiring path extending from an electric-discharge pulse generating unit (6) to the machining gap, and the rectifying element (23) is so connected as to cause machining pulse currents to flow in an intended direction during the electric discharge generation.

18 Claims, 10 Drawing Sheets

U.S. PATENT DOCUMENTS 6,169,261 B1 * 1/2001 Li et al. .................. 219/69.13
6,566,823 B2 * 5/2003 Kinbara et al. ........... 219/69.13
6,660,957 B1 * 12/2003 Ohguro et al. ........... 219/69.13

FOREIGN PATENT DOCUMENTS

| | | | |
|---|---|---|---|
| JP | 61-4620 A * | 1/1986 |
| JP | 61-260917 A | 11/1986 |
| JP | 3-55117 A | 3/1991 |
| JP | 6-143043 A * | 5/1994 |
| JP | 2005-177879 A * | 7/2005 |

* cited by examiner

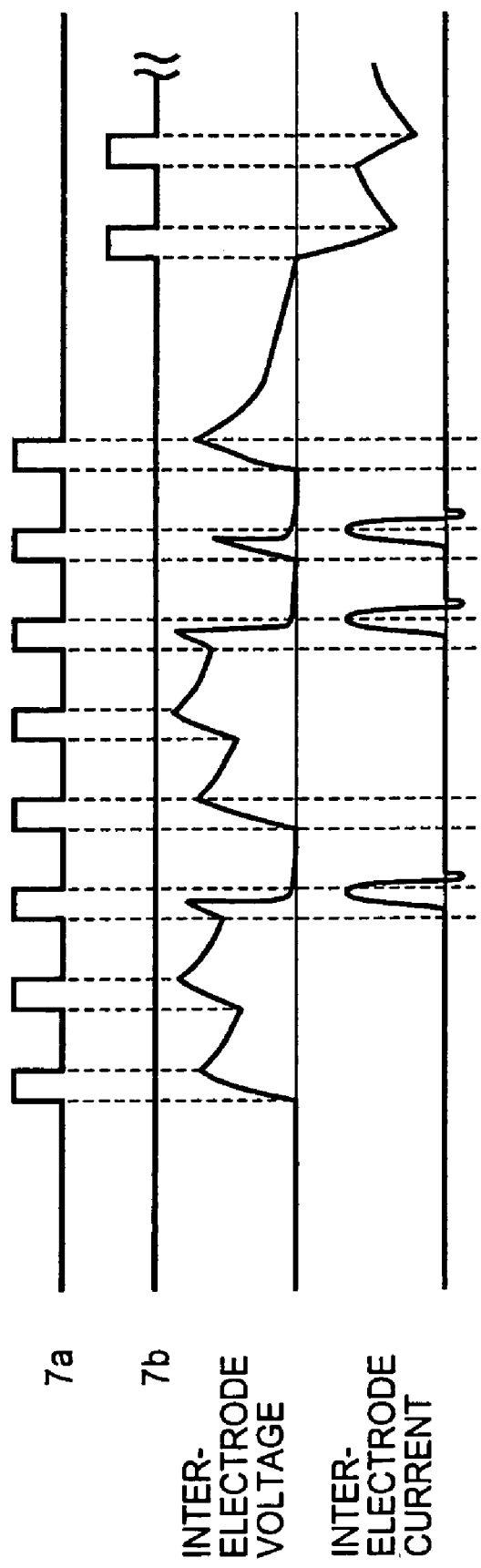

Fig. 3A  Fig. 3B

DURING POSITIVE-POLARITY-SIDE
ELECTRIC DISCHARGE

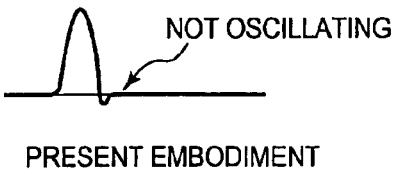

ELECTRIC-
DISCHARGE
MACHINING
CURRENT
VALUE

CONVENTIONAL
TECHNOLOGY

NOT OSCILLATING

PRESENT EMBODIMENT

Fig. 4A  Fig. 4B

DURING POSITIVE-POLARITY-SIDE CONSECUTIVE
ELECTRIC DISCHARGES

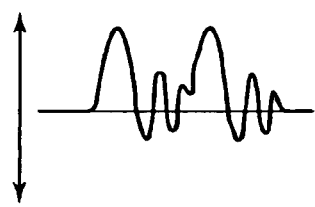
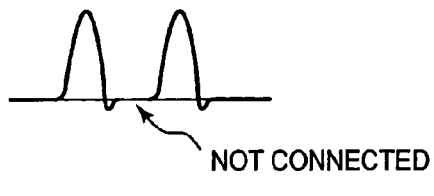

ELECTRIC-
DISCHARGE
MACHINING
CURRENT
VALUE

CONVENTIONAL
TECHNOLOGY

NOT CONNECTED

PRESENT EMBODIMENT

Fig. 5A  Fig. 5B

DURING NEGATIVE-POLARITY-SIDE ELECTRIC DISCHARGE

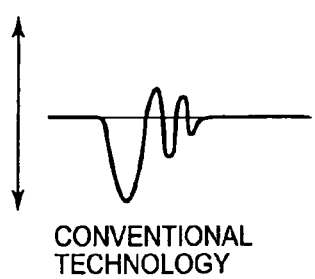
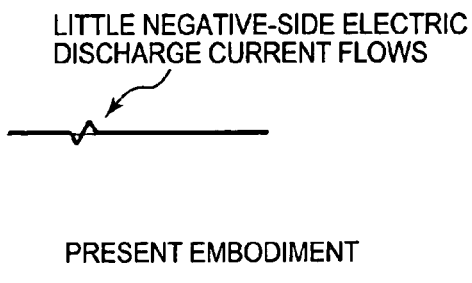

ELECTRIC-
DISCHARGE
MACHINING
CURRENT
VALUE

CONVENTIONAL
TECHNOLOGY

LITTLE NEGATIVE-SIDE ELECTRIC
DISCHARGE CURRENT FLOWS

PRESENT EMBODIMENT

ELECTRIC-DISCHARGE-MACHINING POWER SUPPLY APPARATUS AND SMALL-HOLE ELECTRIC-DISCHARGE MACHINING APPARATUS

TECHNICAL FIELD

The present invention relates to power supply apparatuses for electric-discharge machining, and in particular relates to machined-surface roughness enhancement, machining velocity enhancement, and reduction of the amount of electrode wear.

BACKGROUND ART

A power supply apparatus for electric-discharge machining using an alternate-current pulse system in which voltage of positive and negative polarities is applied across the gap between an object to be machined and a machining electrode is disclosed, for example, in Japanese Patent Laid-Open No. 55117/1991

Patent document 1: Japanese Patent Laid-Open No. 55117/1991

DISCLOSURE OF THE INVENTION

[Problem That the Invention is to Solve]

Here, in the power supply apparatus for electric-discharge machining disclosed in the patent document, a case will be described in which, when the positive polarity voltage is applied, for example, electric discharges occur in three portions of A, B, and C in FIG. 12.

When an electric discharge occurs in the portion A, a discharge current value, which is the addition of a discharge current generated by discharging electric charge charged in the capacitance of a capacitor and the floating capacitance in feeder wiring and the like, and a charging current from a positive-polarity-side power supply, is supplied to the machining gap.

When monitoring the discharge current pulse waveform, it can be understood that an oscillating current caused by the inductance of the wiring and the capacitance within the circuit continues for a certain period of time after a falling edge of the earlier-described large discharge current due to the electric discharge from the capacitor and the charging current from the power supply.

It should be noted in this case that, because the shorter the pulse width of the discharge current, the finer the electric discharge marks on the machined surface so that the machined surface becomes smooth, the charging current from the positive-polarity-side power supply is configured such that on-time in the pulse train is set to be short enough so as not to affect the pulse width of the discharge current.

However, in a case in which an electric discharge occurs in the portion B and another electric discharge immediately occurs in succession in the portion C, the discharge current pulses sometimes become continuous because of the above described oscillating current generation.

Such electric discharges occur in a state in which a large discharge current of a long pulse width is flowing concentratedly at one point in the machining gap, and there is a problem in that large electric discharge marks are generated on the machined surface of the object to be machined, so that the machined surface becomes rough.

Moreover, if three or four discharge current pulses are connected in series, the impact becomes larger.

In addition, as illustrated in FIG. 13, in order to cope with the above-described problem, the pulse-off time can be made long so that the discharge current pulses are not connected even if electric discharges continuously occur. However, in such a case, there is a problem in that, because most of voltages that have risen up during the pulse-on time fall down during the pulse-off time, even if pulses in the pulse train are continuously generated, the inter-electrode voltage does not rise up to near the voltage V1 of the power supply, and if the pulse-off time is long, the number of generated pulses per time gets small, so that machining efficiency significantly deteriorates, and the machining velocity slows down.

In the meantime, in small-hole machining using an AC pulse system, electrode wear due to generation of discharge current pulses in the negative polarity side is significant. In particular, in the case of a thin electrode whose diameter is 0.2 mm or smaller, the electrode wear due to the discharge current in the negative polarity side is severe.

More specifically, the thinner in diameter an electrode for small-hole machining, the more expensive the electrode is, so that increase of the electrode wear largely affects the machining-cost increase, and leads to setup-time increase due to increase of the electrode exchange frequency.

In the meantime, when water is used for machining fluid, although an AC voltage by the AC pulse system is applied across the machining gap in order to suppress electrolytic etching. The discharge current generation in the negative polarity side causes increase of the amount of electrode wear in the same manner.

The present invention has been made to resolve such problems, and aims to achieve an electric-discharge-machining power supply apparatus that can flow discharge current pulses in the machining gap uniformly and efficiently, and can realize reduction of the amount of electrode wear in machining in the AC pulse system.

[Means for Solving the Problem]

In an electric-discharge-machining power supply apparatus relevant to the present invention, a circuit composed of a parallel connection of a resistor and a rectifying element such as a diode is inserted in series along a wiring path extending from an electric-discharge pulse generating unit to the machining gap, and the rectifying element is so connected as to cause machining pulse currents to flow in an intended direction during the electric discharge generation.

[Effects of the Invention]

According to the present invention, because, by inserting a circuit composed of a parallel connection of a resistor and a rectifying element such as a diode in series along a wiring path extending from an electric-discharge pulse generating unit to the machining gap, during the positive-polarity-side electric discharge, current oscillation after a failing edge of a discharge current pulse can be suppressed, even if electric discharges are generated in succession at short intervals, discharge current pulses are never connected to each other. Therefore, uniform electric discharge pulse currents having a narrow pulse-width can be obtained, so that machining in which the machined surface is uniform and the surface roughness is fine can be achieved. Moreover, because the pulse-off time can be set short, the machining efficiency is enhanced, so that the machining velocity can be set fast.

Furthermore, according to the present invention, a circuit composed of a parallel connection of a resistor and a rectifying element such as a diode is inserted in series with the machining gap, whereby the discharge current when an electric discharge is generated in the negative polarity side hardly flows even in machining by an AC pulse system, so that the amount of electrode wear can be significantly reduced.

BRIEF DESCRIPTION OF DRAWINGS

FIG. 2 is a waveform diagram in the electric-discharge machining apparatus explaining Embodiment 1.

FIG. 3 is a diagram illustrating electric-discharge-machining current values during a positive-polarity-side electric discharge.

FIG. 4 is a diagram illustrating electric-discharge-machining current values during positive-polarity-side consecutive electric discharges.

FIG. 5 is a diagram illustrating electric-discharge-machining current values during a negative-polarity-side electric discharge.

[Description of the Symbols]

1: electric-discharge machining apparatus main unit, 2: machining power supply apparatus, 6: electric-discharge pulse generating unit, 22: reverse-current blocking circuit, 23: resistor, 24: diode

BEST MODE FOR CARRYING OUT THE INVENTION

Embodiment 1

Figure 1:
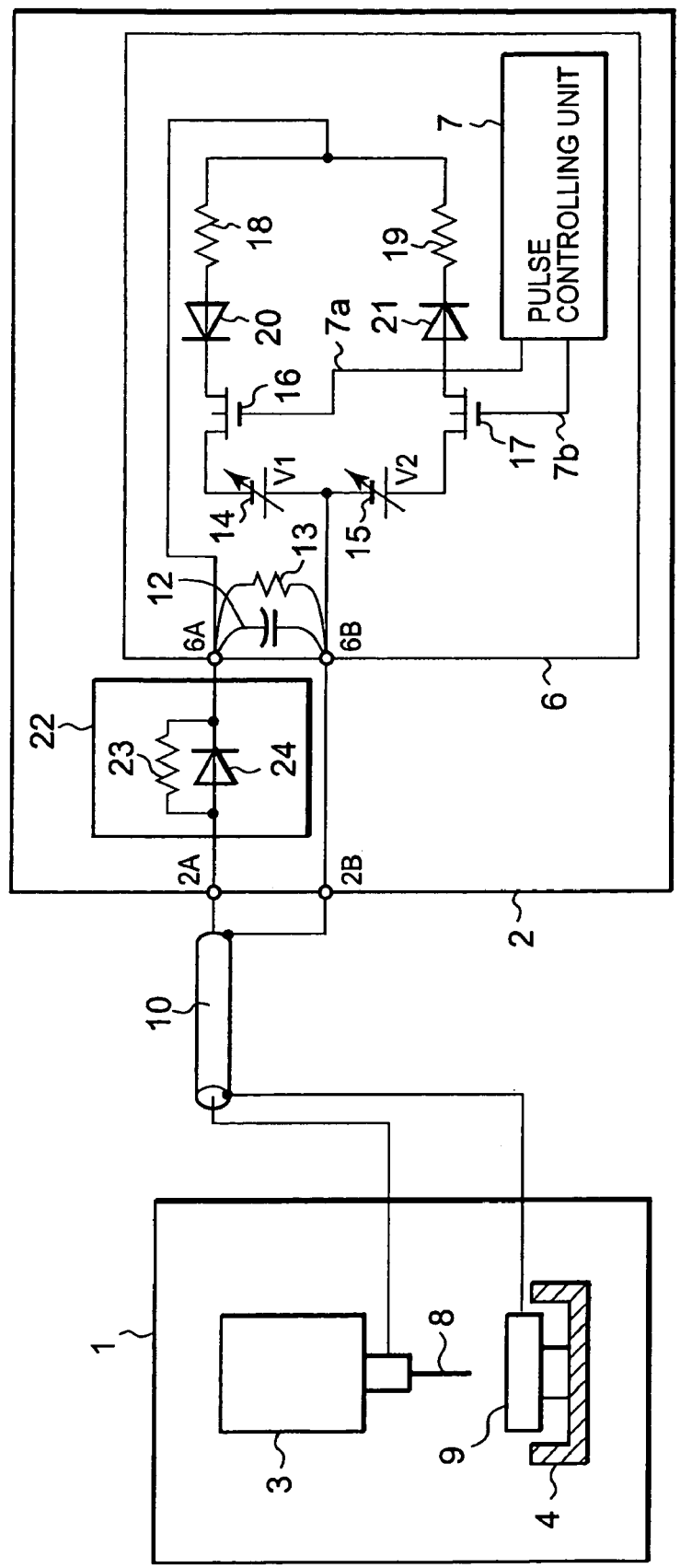
FIG. 1 is a configuration diagram of an electric-discharge machining apparatus explaining Embodiment 1.

FIG. 1 illustrates the configuration of an electric-discharge machining apparatus according to the present invention.

In the diagram, the main unit 1 of the electric-discharge machining apparatus includes a working head 3 supporting a machining electrode 8 facing an object 9 to be machined, placed in a work tank 4 in which machining fluid is stored.

In addition, the machine main unit 1 is connected via feeder wiring 10 to a machining power supply apparatus 2.

The machining power supply apparatus 2 includes a well-known electric-discharge pulse generating unit 6, and a reverse-current blocking circuit 22—a characterizing portion of the present embodiment—in which a diode 24 and a resistor 23 are connected in parallel.

The electric-discharge pulse generating unit 6 includes a pulse controlling unit for outputting driving pulse signals 7a and 7b for on/off-controlling switching devices 16 and 17 such as MOS-FETs, connected to DC power supplies 14 and 15, respectively, in which voltages V1 and V2 are variable. Either voltage of the DC power supplies 14 or 15 is applied by the driving pulse signals 7a and 7b via current-limiting resistors 18 and 19, and diodes 20 and 21 across the gap between the machining electrode 8 and the object 9 to be machined.

Moreover, numeral 12 denotes a capacitor connected in parallel with the machining electrode 8 and the object 9. Numeral 13 denotes a resistor for discharging the capacitor 12 with a long time-constant.

The reverse-current blocking circuit 22 is inserted in series along a wiring path for supplying pulse power from the pulse generating unit 6 to the machining gap. The diode 24 is so connected as to cause machining pulse currents to flow in an intended direction.

More specifically, in an electric-discharge machining apparatus, the polarity of voltage to be applied across the gap between the electrode and the object to be machined is changed in consideration of the machining velocity and electrode wear characteristics depending on an electrode to be used, material of an object to be machined, the area to be machined, the type of machining fluid filled in the machining gap, or the like.

If the discharge current is flowed always in the unintended direction, not only the electrode will severely waste away, but the machining will not proceed well, so that the connection polarity of the diode 24 should be changed according to the intended purpose.

For example, in a small-hole electric discharge machine for drilling small holes or in a wire-cut electric discharge machine, as illustrated in FIG. 1, the diode is connected such that its polarity matches the current-flowing direction from the object 9 to the machining electrode 8.

In addition, in a die-sinking electric discharge machine, although the diode is usually connected such that its polarity matches the current-flowing direction from the electrode 8 to the object 9, in a case in which the surface should be finely finished, or a case in which graphite is used as an electrode for machining, the diode is sometimes connected in the reverse polarity.

It should be noted that the diode 24 is an element through which the discharge current flows when the object to be machined is in the positive polarity, and the current does not flow when the object is in the negative polarity, and the reverse-polarity current must be quickly blocked. Therefore, short recovery-time elements such as a fast recovery diode and a schottky barrier diode are selected to be used. When the rated voltage is low, some of them are connected in series. When the rated current is low, some of them are connected in parallel.

Next, the necessity of connecting the resistor 23 will be described.

The resistor 23 is for applying the voltage V2 of the DC power supply 15 to the machining gap via the switching device 17, the diode 21, the current-limiting resistor 19, and the resistor 23 so that the polarity of the object 9 to be machined is negative with respect to the electrode 8, when the switching device 17 is turned on by the driving pulse signal 7b from the pulse controlling unit 7.

Necessary requirements for selecting the resistance value of the resistor 23 are: to be able to charge in a short time a little bit of floating capacitance in the machining gap when the voltage is applied to the object 9 such that its polarity is negative with respect to the electrode 8; that the discharge current to the inter-electrode gap, which is addition of the electric discharge of the electric charge charged in the capacitance of the capacitor 12 and the floating capacitance in the feeder wiring 10 and other elements, and the current supplied from the DC power supply 15, when the object is in negative polarity, is small enough compared with the discharge current flowing when the object is in positive polarity; and that the resistance value is small enough compared with input resistances of unillustrated various detector circuits connected in parallel with the pulse generating unit 6, to perform accurate detection of the inter-electrode state.

It is practical to select the actual resistance value to be around between 100Ω to several thousand Ω.

Firstly, basic operations of the electric discharge machining will be described using FIG. 1 and FIG. 2.

The DC power supplies 14 and 15 are connected across the machining gap between the machining electrode 8 and the object 9 to be machined such that their polarities are opposite with each other.

The pulse controlling unit 7 generates for the switching device 16 the driving pulse signal 7a including a predetermined number of pulses at a predetermined on/off time period, and after a predetermined downtime, the pulse controlling unit generates for the switching device 17 the driving pulse signal 7b including the same number of pulses as those of the signal 7a.

Accordingly, the driving pulse signal 7a and the driving pulse signal 7b are alternately repeated with the predetermined downtime. When the driving pulse signal 7a is high, the switching device 16 is turned on, and the voltage V1 of the DC power supply 14, while charging the capacitor 12 through the switching device 16, the diode 20, and the current-limiting resistor 18, is applied through the diode 24 in the reverse-current blocking circuit 22 across the gap between the electrode 8 and the object so that the object 9 is in positive polarity.

In this case, the capacitor 12 is charged such that the object 9 is in positive polarity with respect to the electrode 8 with the time constant determined mainly by the resistance value of the current-limiting resistor 18 and the capacitance of the capacitor 12.

In the meantime, when the driving pulse signal 7a is low, the switching device 16 is turned off, so that applying the voltage V1 of the DC power supply 14 is cut off, and the electric charge in the capacitor 12 is gradually discharged through the discharging resistor 13 with the time constant determined mainly by the resistance value of the discharging resistor 13 and the capacitance of the capacitor 12.

Here, the resistance value of the discharging resistor 13 is determined to be large enough compared with the resistance value of the current-limiting resistor 18 for charging, and even if the switching device 16 is turned off, the electric charge in the capacitor 12 does not run down immediately, so that the voltage across the machining gap between the machining electrode 8 and the object 9 is rising step by step, in response to the first pulse, the second pulse, and the like in the pulse train, up to around the voltage V1 of the DC power supply 14.

When the pulse train is terminated, a pulse downtime starts, and the inter-electrode voltage is gradually going down to around 0 V.

Then, after a predetermined pulse downtime, a pulse train in the negative polarity side is generated.

The operation in the negative polarity side is similar to the operation in the positive polarity side described above. When the switching device driving pulse 7b is high, the switching device 17 is turned on, and the voltage V2 of the DC power supply 15, while charging the capacitor 12 through the switching device 17, the diode 21, and the current-limiting resistor 19, is applied further through the resistor 23 in the reverse-current blocking circuit 22 across the gap between the electrode 8 and the object.

In this case, the capacitor 12 is charged such that the object 9 is in negative polarity with respect to the electrode 8 with the time constant determined mainly by the resistance value of the current-limiting resistor 19 and the capacitance of the capacitor 12.

In the machining gap, in addition to a little bit of floating capacitance between the electrode 8 and the object 9, the power feeder wiring 10 also has capacitance. Voltage can be applied to the machining gap by supplying electric charge to these capacitances through the resistor 23.

In this case, because the diode 24 in the reverse-current blocking circuit 22 is biased in the reverse direction, no current flows therethrough, so that the diode does not contribute to applying voltage across the machining gap.

In the meantime, when the driving pulse signal 7b is low, the switching device 17 is turned off, so that the voltage V2 of the DC power supply 15 is cut off, and the electric charge in the capacitor 12 is gradually discharged through the discharging resistor 13 with the time constant determined mainly by the resistance value of the discharging resistor 13 and the capacitance of the capacitor 12.

Here, the resistance value of the discharging resistor 13 is determined to be large enough compared with the resistance value of the current-limiting resistor 19 for charging, and even if the switching device 17 is turned off, the electric charge in the capacitor 12 does not run down immediately, so that the voltage across the gap between the machining electrode 8 and the object 9 is rising step by step, in response to the first pulse, the second pulse, and the like in the pulse train, up to around the voltage V2 of the DC power supply 15.

Next, the operation during the electric discharge generation will be described using the configuration diagram in FIG. 1 and current waveforms in FIG. 3, FIG. 4, and FIG. 5.

In a case in which an electric discharge is generated as the result of applying voltage to the machining gap such that the object 9 is in the positive polarity with respect to the electrode 8 by the driving pulse signal 7a from the pulse controlling unit 7, the diode 24 is forwardly biased, so that the discharge current from the electric charge in the capacitor 12 and the charging current supplied from the DC power supply 14 flow as a discharge current pulse from the power feeder wiring 10 along the path through the object 9, the electrode 8, the power feeder wiring 10, and the diode 24.

Regarding the discharge current, after the current whose pulse height value is high, the current tries to flow in the negative polarity direction. However, in the circuit according to the present embodiment, if the current tries to flow in the negative polarity direction, the diode 24 is reversely biased, so that no current flows through the diode 24.

In the actual configuration, because the diode 24 has a reverse recovery time, a little bit of current flows during that time. However, an oscillating current as described in the conventional technology illustrated in FIG. 12 does not continue, and the current is shut off in an extremely short time.

FIG. 3 is a diagram illustrating the relationship.

It should be noted that the shorter the reverse recovery time of the diode that is selected, the shorter the time during which the negative-polarity current flows, so that an oscillating current is effectively suppressed.

In addition, the resistor 23 connected in parallel with the diode 24 has a high resistance value, so that only a little current flows through the resistor 23.

Therefore, according to the present configuration, little oscillating current to follow the high pulse-height current is generated as illustrated in FIG. 3, so that it is possible to flow a narrow-pulse discharge current through the machining gap.

Figure 12:
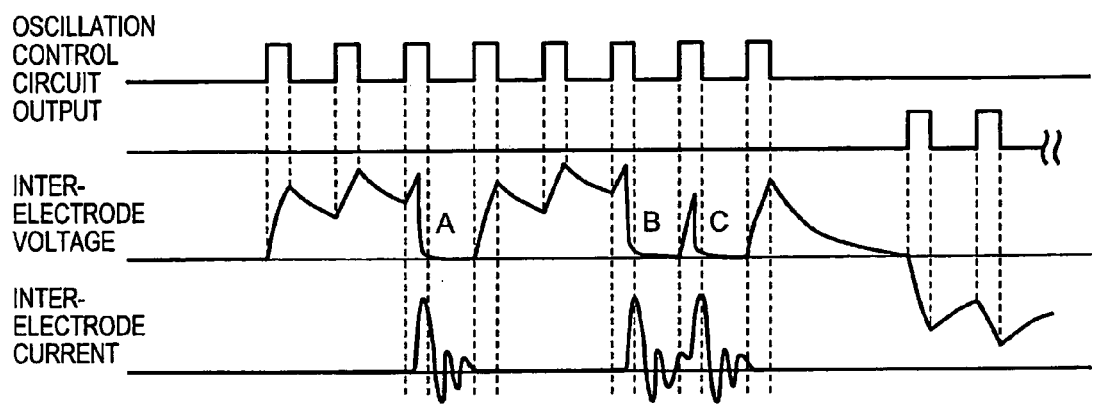
FIG. 12 is a diagram illustrating inter-electrode waveforms when conventional electric discharges are generated.
Figure 13:
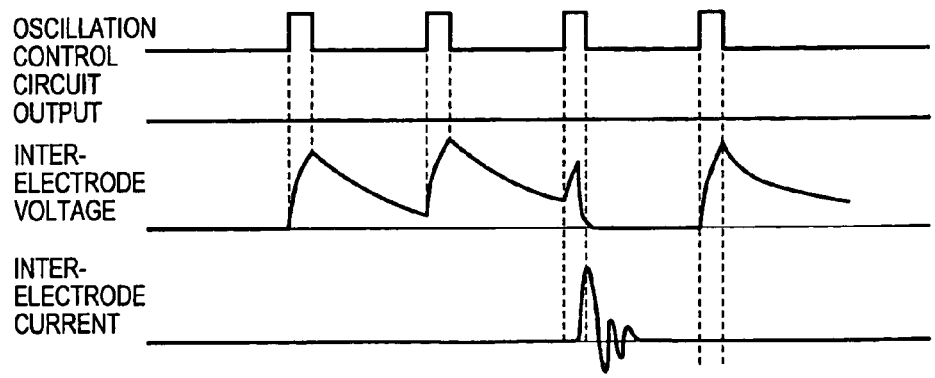
FIG. 13 is a diagram illustrating inter-electrode waveforms when conventional electric discharges are generated.

Moreover, when electric discharges are generated in succession as illustrated in FIG. 12 described as a conventional technology, an oscillating current flows following the high pulse-height current, whereby the pulse currents are sometimes connected with each other. However, according to the configuration of the present invention, because the oscillating current is cut off in a very short time as described above, even if electric discharges are generated in succession, the currents are not connected as in the current waveform in FIG. 4, so that it is possible to flow narrow-pulse current pulses for sure.

In the meantime, when applying the positive polarity voltage, the resistor 23 is connected in parallel with the forwardly-biased diode 24, whereby little voltage is applied across the resistor 23, and accordingly little current flows therethrough.

Next, the operations in which electric discharges are generated in the negative polarity side will be described.

As illustrated in FIG. 5, in a current waveform according to the conventional technology, when the switching device 17 is turned on, the current from the electric charge stored in the capacitor 12 and from the DC power supply V2 lasts as an oscillating current for a while following a large pulse-height electric discharge pulse.

However, according to the configuration of the present embodiment, the electric charge stored in the capacitor 12 by the switching device 17 being turned on does not flow through the diode 24, but flows only a little through the resistor 23.

In the meantime, the electric charge stored in the floating capacitors in the machining gap and in the power feeder wiring 10, which is closer to the machining gap than the reverse-current blocking circuit 22, flows through the machining gap as a discharge current, when an electric discharge is generated. Because the electric charge stored in the floating capacitors is smaller than the electric charge stored in the capacitor 12, the discharge current exhibits the waveform of the present embodiment as illustrated in FIG. 5b. As a result, the discharge current can be suppressed to a very low level.

According to the present embodiment, because a narrow-pulse discharge current pulse that accompanies little oscillation at the falling edge of the discharge current pulse during the positive-polarity-side electric discharge can be obtained for sure, even if electric discharges are generated in succession, the discharge current pulses are never connected with each other. Therefore, an electric-discharge-machined surface whose machined-surface roughness is fine and uniform can be obtained. In addition, because the off-time of the switching devices can be set shorter, the machining velocity can be increased.

Moreover, because the negative-polarity-side discharge current hardly flows, in a power supply apparatus using the AC pulse system, an electrode wear amount to be burn out by electric discharge machining can be largely decreased.

Furthermore, a power supply apparatus for electric-discharge machining described in the present embodiment is applied to a small-hole electric-discharge machining apparatus for hole-machining using a pipe electrode or a rod electrode, whereby electrode wear can be suppressed. Accordingly, the number of holes that can be machined by one electrode increases, so that there is not only an effect of reducing electrode cost, but an effect of reducing man-hours for changing electrodes. In particular, it is effective on a small-hole electric-discharge machining apparatus for holes having a diameter of 0.2 mm or smaller.

Moreover, because damage to a wire electrode can be reduced by applying the present embodiment to a wire-cut electric-discharge machining apparatus, the wire feed rate can be set to be slow, so that there is an effect of reducing the used amount of the wire electrode.

Embodiment 2

Next, the present Embodiment 2 will be described using a configuration diagram in FIG. 6.

In the present embodiment, based on the configuration in FIG. 1 described in Embodiment 1, the reverse-current blocking circuit 22 being a parallel circuit consisting of the diode 24 and the resistor 23 is disposed in the machine main unit side, so that its installation position is different. The rest of the configuration is the same as in Embodiment 1.

Here, in the present embodiment, the reverse-current blocking circuit 22 is inserted, for example, at the end of the power feeder 10, close to the electrode 8 mounting portion of the electric discharge machine main unit 1, such that the wiring is as short as possible.

According to the present configuration, when voltage is applied to the object 9 to be machined such that its polarity is negative with respect to the electrode 8, the electric charge that is present in the machining gap side from the circuit 22 is only the electric charge stored in a very little floating capacitance in the machining gap. The discharge current when an electric discharge is generated is only a discharge current from the little electric charge and a very little current flowing through the resistor 23 in the circuit 22, so that the discharge current can be made further smaller than the discharge current in FIG. 5 described in Embodiment 1.

In addition, if the distance between the machining power supply apparatus 2 and the machining gap between the electrode 8 and the object 9 is large because of the large size of the electric-discharge machining apparatus main unit 1 or the like, the feeder wiring 10 becomes longer so that the electric charge charged in the capacitance of the feeder wiring is also large. However, the discharge current from this electric charge to the machining gap can be suppressed for sure.

Embodiment 3

Figure 7:
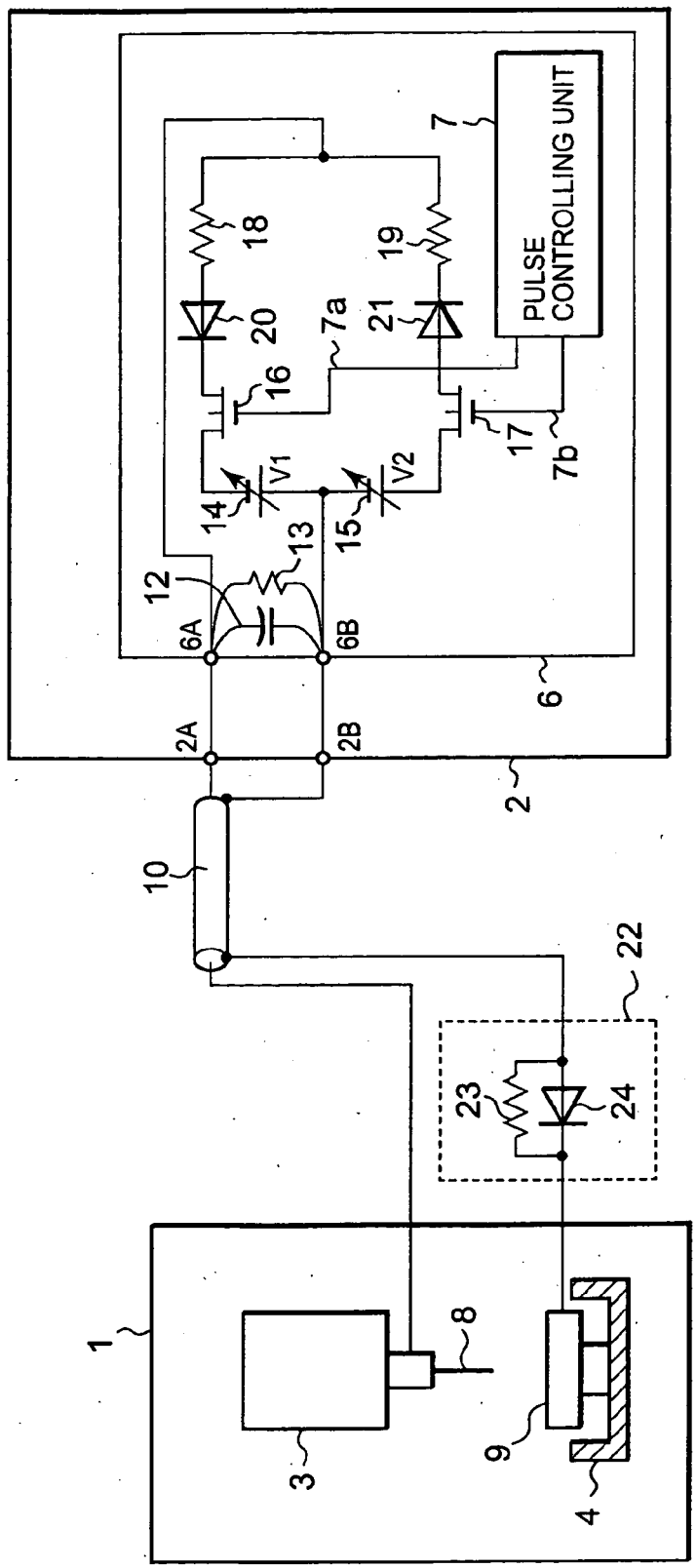
FIG. 7 is a configuration diagram of an electric-discharge machining apparatus explaining Embodiment 3.

Next, the present Embodiment 3 will be described using FIG. 7.

In the present embodiment, the insertion position of the reverse-current blocking circuit 22 being a parallel circuit consisting of the diode 24 and the resistor 23, described in Embodiment 2, is changed from the electrode 8 mounting portion to a mounting portion for the object to be machined.

Figure 6:
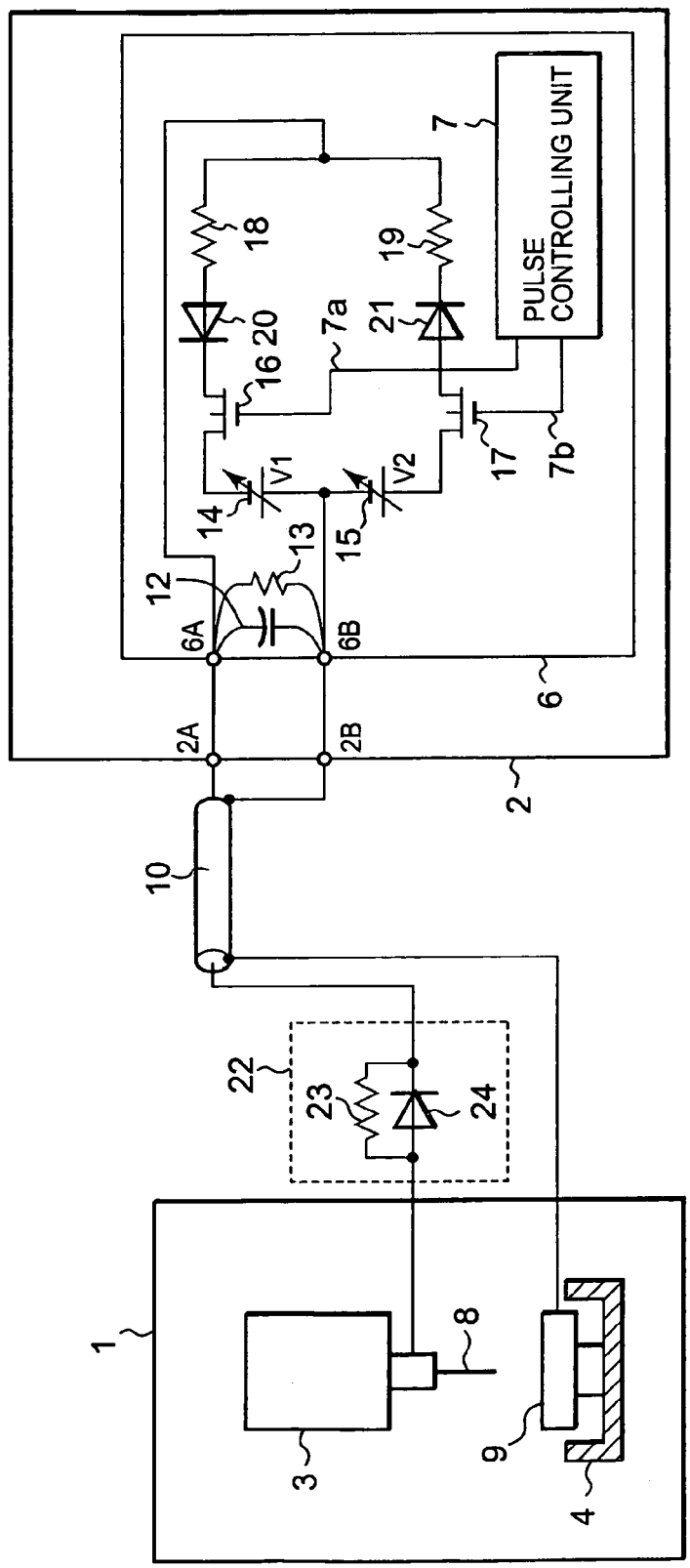
FIG. 6 is a configuration diagram of an electric-discharge machining apparatus explaining Embodiment 2.

In addition, because the connecting direction of the diode 24 is such that its polarity matches an intended direction of the current flow, the diode 24 is connected such that the polarity is in the reverse direction with respect to that of Embodiment 2 in FIG. 6.

Moreover, the operations and actions are identical to those described in Embodiment 2.

Embodiment 4

Next, a substitute example of the above-described reverse-current blocking circuit 22 being a parallel circuit consisting of the diode 24 and the resistor 23 will be described.

Figure 8:
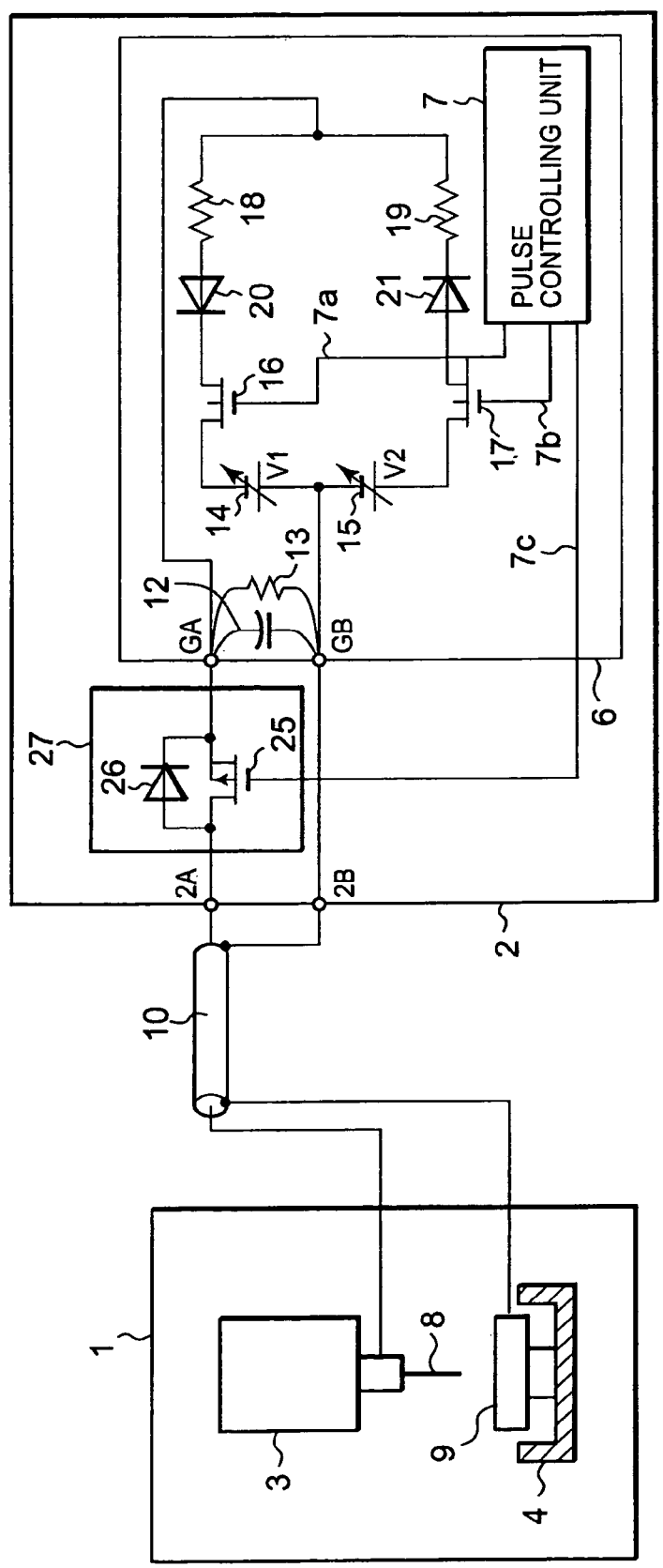
FIG. 8 is a configuration diagram of an electric-discharge machining apparatus explaining Embodiment 4.

FIG. 8 is an example in which the reverse-current blocking circuit 22 in FIG. 1 is replaced with a MOS-FET 27 including a parasitic diode 26.

The MOS-FET 27 is inserted in series along the wiring path for supplying pulse power from the pulse generating unit 6 to the machining gap. The MOS-FET is connected such that the direction of a current flowing through the internal parasitic diode 26 in the MOS-FET 27 matches the intended direction of the flow of the machining pulse current, and the reverse direction current also flows when the MOS-FET 27 is turned on.

For example, in a small-hole electric discharge machine for drilling small holes or a wire-cut electric discharge machine, because the internal parasitic diode 26 in the MOS-FET 27 is connected such that its polarity matches the current-flowing direction from the object 9 to be machined to the machining electrode 8 as illustrated in FIG. 8, when a P-channel MOS-FET is used as an example, the MOS-FET is connected in the direction indicated in the diagram.

Here, the internal parasitic diode 26 in the MOS-FET 27 is for flowing the discharge current when the object is in positive polarity, and for not flowing the current when the object is in negative polarity. The internal parasitic diode can work identically to the diode 24 explained in Embodiment 1 through Embodiment 3.

The MOS-FET 27 can work similarly to the resistor 23 explained in Embodiment 1 through Embodiment 3 by generating the voltage of the driving signal 7c such that the state between the source and the drain is an intermediate state between on and off when the object is in negative polarity.

Figure 9:
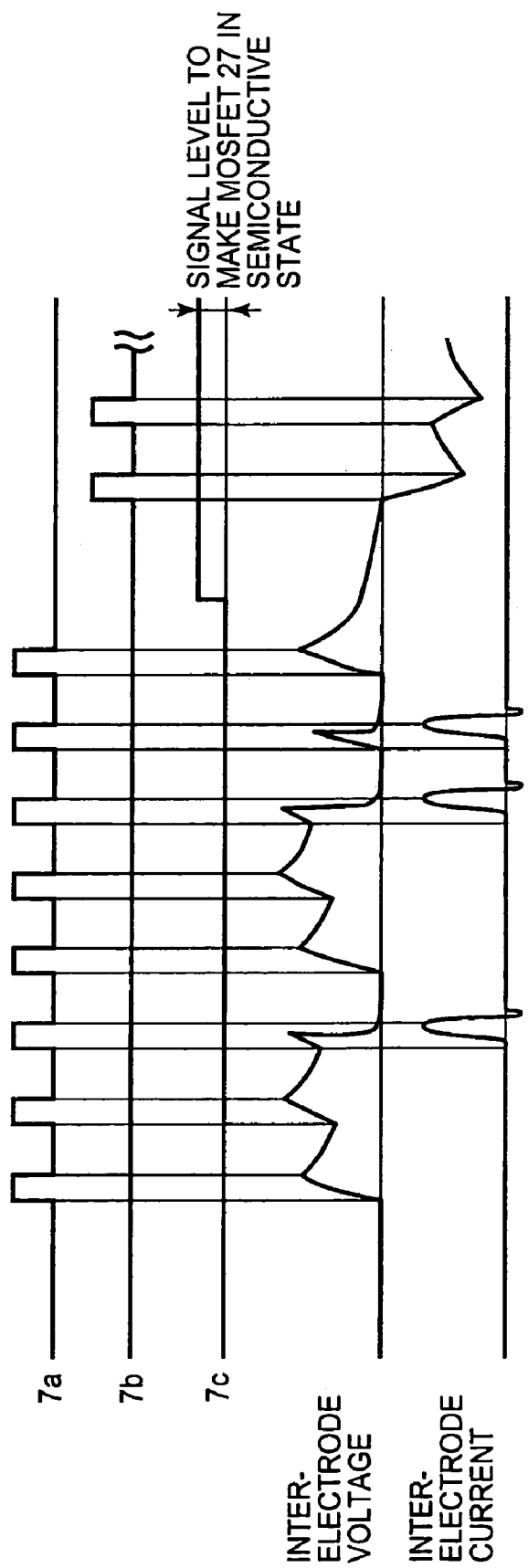
FIG. 9 is a waveform diagram of the electric-discharge machining apparatus explaining Embodiment 4.

FIG. 9 illustrates generation timing of the driving signal 7c for the FET.

Regarding operations during electric discharge generation in the configuration diagram in FIG. 8, in the same manner as in Embodiment 1, in a case in which an electric discharge is generated as the result of applying voltage across the machining gap by the driving pulse signal 7a from the pulse controlling unit 7 such that the object 9 is in positive polarity with respect to the electrode 8, the discharge current from the electric charge in the capacitor 12 and the charging current supplied from the DC power supply 14 flow as a discharge current pulse along the path through the power feeder wiring 10, the object 9, the electrode 8, the power feeder wiring 10, and the internal parasitic diode 26 in the MOS-FET 27.

Regarding the discharge current, after the current whose pulse height value is high, the current tries to flow in the negative polarity direction. However, in the circuit according to the present embodiment, if the current tries to flow in the negative polarity direction, the internal parasitic diode 26 in the MOS-FET 27 is reversely biased, so that no current flows through the diode 26.

In the actual configuration, because the internal parasitic diode 26 in the MOS-FET 27 has a reverse recovery time, a little bit of current flows during that time. However, an oscillating current as illustrated in FIG. 6 described in a conventional technology does not continue, and the current is shut off in an extremely short time. Even if electric discharges are generated in succession, the currents are not connected with each other, so that it is possible to flow narrow-pulse current pulses for sure.

The operation in the negative polarity side is similar to the operation in the positive polarity side described above. In a case in which an electric discharge is generated as the result of applying voltage across the machining gap by the switching device driving pulse 7b such that the object 9 is in negative polarity with respect to the electrode 8, the electric charge stored in the capacitor 12 does not flow through the internal parasitic diode 26 in the MOS-FET 27, but flows only a little through the main portion of the MOS-FET 27 that is in an immediate state between on and off.

In the meantime, the electric charge stored in the floating capacitors in the machining gap and in the power feeder wiring 10, which is closer to the machining gap than the MOS-FET 27, flows through the machining gap as a discharge current, when an electric discharge is generated.

Because the electric charge stored in the floating capacitors is smaller than the electric charge stored in the capacitor 12, the discharge current exhibits the waveform similar to that of Embodiment 1 as illustrated in FIG. 5b. As a result, the discharge current can be suppressed to a very low level.

According to the present embodiment, the MOS-FET 27 is operated to be in an intermediate state between on and off by the control signal 7c from the pulse controlling unit 7, so that effects similar to that of Embodiment 1 can be achieved.

Figure 10:
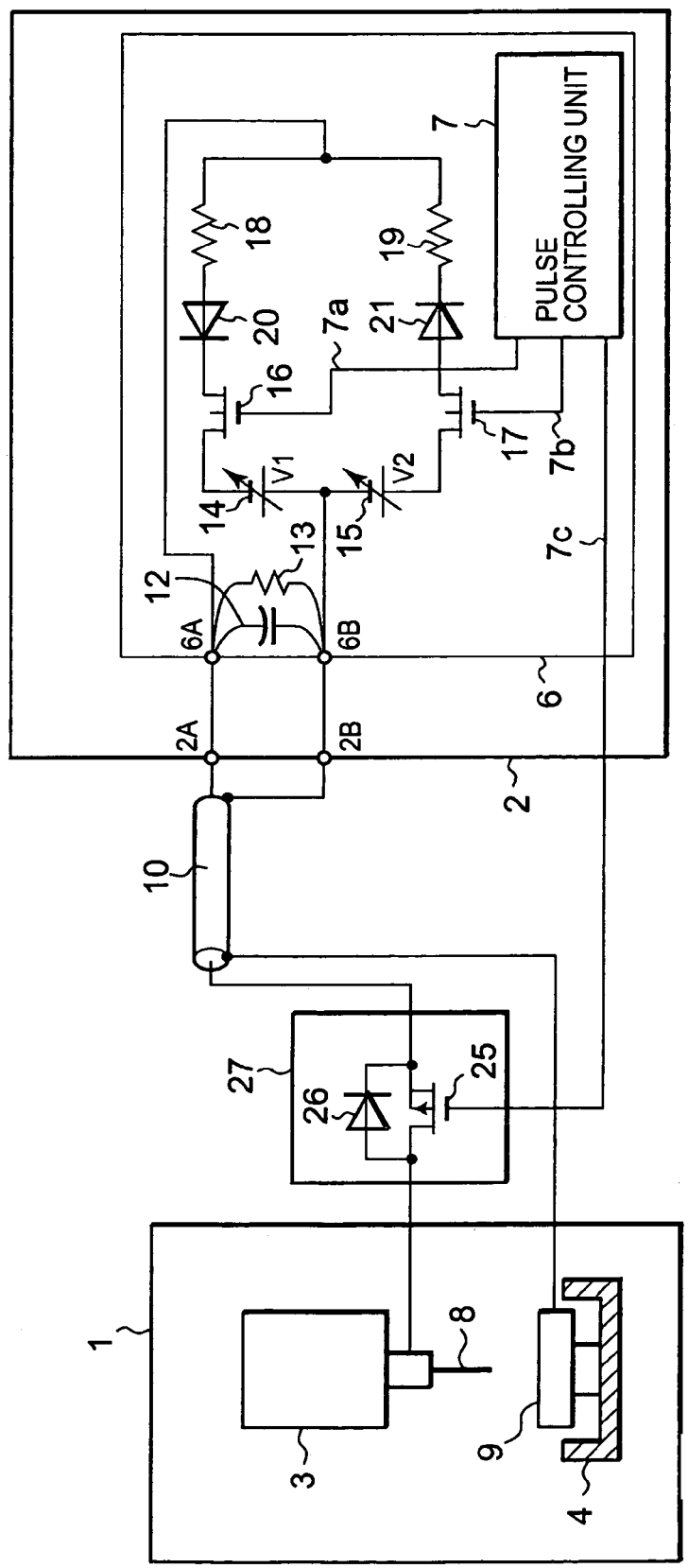
FIG. 10 is a diagram of a substituted configuration of the electric-discharge machining apparatus in Embodiment 4.
Figure 11:
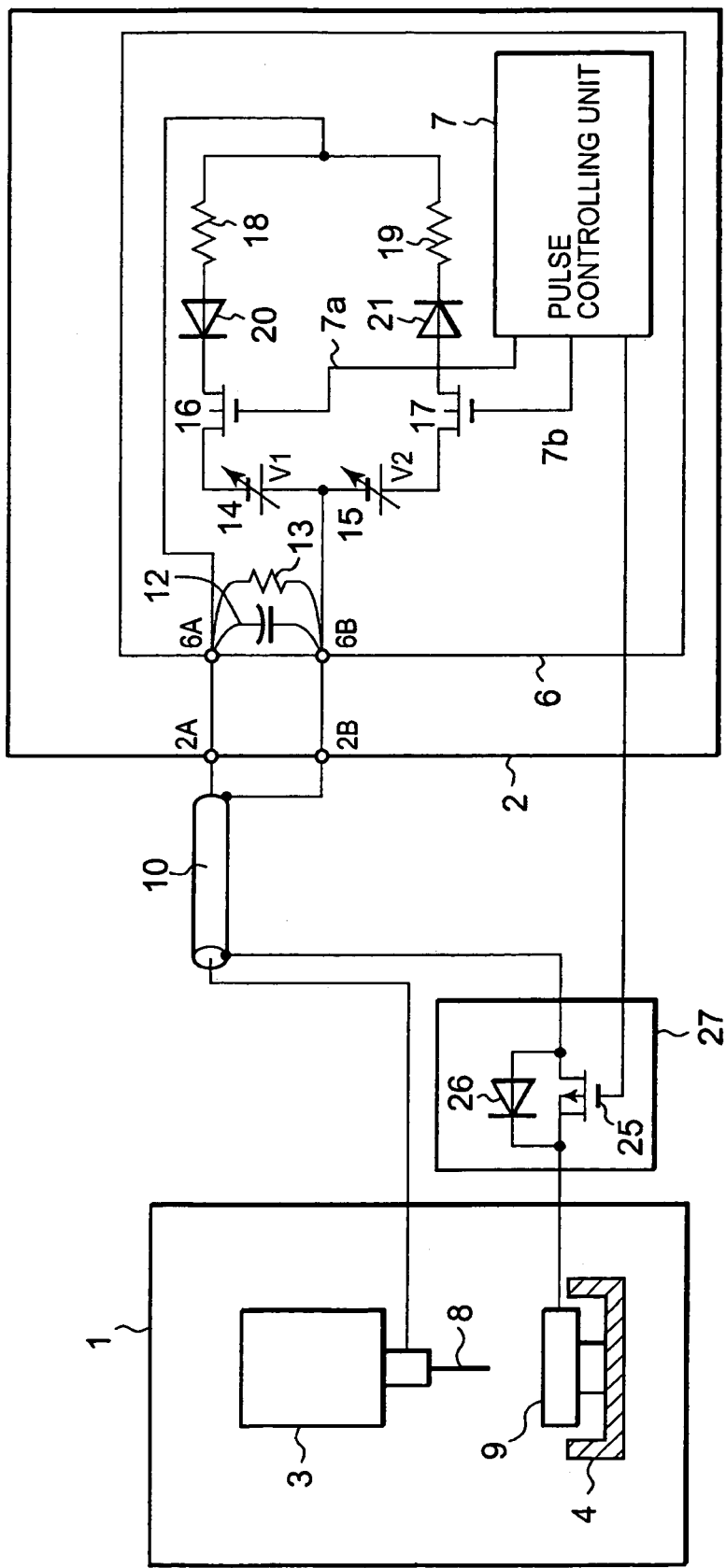
FIG. 11 is a diagram of another substituted configuration of the electric-discharge machining apparatus in Embodiment 4.

Moreover, as illustrated in FIGS. 10 and 11, the reverse-current blocking circuit 22 in Embodiments 2 and 3 can be replaced with the MOS-FET 27 explained in the present embodiment.

Furthermore, as another embodiment, if the MOS-FET 27 is turned into always-on state by the control signal 7c from the pulse controlling unit 7, it is also possible to flow the negative polarity discharge current, so that in a die-sinking electric discharge machine, for example, machining by flowing the current in the direction from the electrode 8 to the object 9 can be performed without a connection change.

Embodiment 5

Next, another substitute example of the above-described reverse-current blocking circuit 22 being a parallel circuit consisting of the diode 24 and the resistor 23 will be described.

The MOSFET can serve as a mere rectifying element by the internal parasitic diode when the MOSFET is in the off state in which the gate signal is not applied.

Therefore, in the present embodiment, the above-described diode 24 is replaced with a MOSFET in the off state.

Regarding the MOSFET connecting direction, the MOSFET is connected such that the polarity of the internal diode is the same as the polarity of the diode 24. In addition, it is better to select such a MOSFET including an internal diode having as short recovery time as possible because the effect of blocking reverse currents is large. It is the same as described in Embodiment 1.

INDUSTRIAL APPLICABILITY

The present invention is suitable to be applied to a small-hole electric-discharge machining apparatus for performing predetermined hole-machining using a small-hole electrode.

What is claimed is:

1. An electric-discharge-machining power supply apparatus for applying electric-discharge-machining pulse voltage to a machining gap between a machining electrode and an object to be machined, comprising:

an electric-discharge pulse generating unit, which generates and applies voltage to the object of positive and negative polarity with respect to the machining electrode; and a circuit comprising a parallel connection of a rectifying element and a resistive element coupled in series along a wiring path, to the electric-discharge pulse generating unit and the machining gap and in parallel with a charging capacitor, wherein machining pulse currents flow through the rectifying element, when the object is in the positive polarity with respect to the machining electrode, and through the resistive element when the object is in the negative polarity with respect to the machining electrode.

2. The electric-discharge-machining power supply apparatus according to claim 1, wherein the circuit comprising the parallel connection of the rectifying element and the resistive element is connected closer to the machining gap than a wiring feeder coupled in the wiring path between the machining gap and the electric-discharge pulse generating unit.

3. The electric-discharge-machining power supply apparatus according to claim 1, wherein the rectifying element is a diode element or an internal diode in a MOSFET, having a short recovery time.

4. The electric-discharge-machining power supply apparatus according to claim 1, wherein a value of the resistive element is selected such that a small amount of floating capacitance in the machining gap is charged in a short time when the negative polarity voltage is applied to the object.

5. The electric-discharge-machining power supply apparatus according to claim 1, wherein a value of the resistive element is selected such that a discharge current to an inter-electrode gap, which discharge current is a sum of an electric discharge current of the charging capacitor and floating capacitance in feeder wiring and detecting wiring, and a current supplied from a DC power supply, when the object is in the negative polarity, is substantially small compared with the discharge current when the object is in the positive polarity, with respect to the machining electrode.

6. The electric-discharge-machining power supply apparatus according to claim 1, wherein a value of the resistive element is selected to be substantially small compared with input resistances of detector circuits connected in parallel to the electric-discharge pulse generating unit, to perform accurate detection of an inter-electrode state.

7. A small-hole electric-discharge machining apparatus for machining an object by applying positive and negative polarity voltages between a small-hole electrode and the object using a soluble machining fluid, comprising:
    an electric-discharge pulse generating unit which generates and applies to the object the positive and negative polarity voltage, with respect to the small-hole electrode; and
    a circuit comprising a parallel connection of a rectifying element and a resistive element coupled in series along a wiring path to the electric-discharge pulse generating unit and the machining gap and in parallel with a charging capacitor,
    wherein a discharge current flows through the rectifying element when an electric discharge occurs when the object is in the positive polarity with respect to the small-hole electrode, and through the resistive element when the electric discharge occurs when the object is in the negative polarity with respect to the machining electrode.

8. The small-hole electric-discharge machining apparatus according to claim 7, wherein the circuit comprising the parallel connection of the rectifying element and the resistive element is connected closer to the machining gap than a wiring feeder coupled in the wiring path between the machining gap and the electric-discharge pulse generating unit.

9. The small-hole electric-discharge machining apparatus according to claim 7, wherein the rectifying element is a diode element having a short recovery time.

10. The small-hole electric-discharge machining apparatus according to claim 7, wherein a value of the resistive element is selected such that a small amount of floating capacitance in the machining gap is charged in a short time when the negative polarity voltage is applied to the object.

11. The small-hole electric-discharge machining apparatus according to claim 7, wherein a value of the resistive element is selected such that a discharge current to an inter-electrode gap, which discharge current is a sum of an electric discharge current of the charging capacitor and floating capacitance in feeder wiring and detecting wiring and a current supplied from a DC power supply, when the object is in the negative polarity, is substantially small compared with the discharge current when the object is in the positive polarity, with respect to the small-hole electrode.

12. A small-hole electric-discharge machining apparatus according to claim 7, wherein a value of the resistive element is selected to be substantially small compared with input resistances of detector circuits connected in parallel to the electric-discharge pulse generating unit, to perform accurate detection of an inter-electrode state.

13. An electric-discharge-machining power supply apparatus for applying electric-discharge-machining pulse voltage to a machining gap between a machining electrode and an object to be machined, comprising:
    an electric-discharge pulse generating unit, which generates and applies to the object positive and negative polarity voltage, with respect to the machining electrode; and
    a switching element comprising a MOSFET including a diode coupled in series along a wiring path to the an electric-discharge pulse generating unit and the machining gap,
    wherein machining pulse currents flow through the internal diode, when the object is in the positive polarity with respect to the machining electrode, and through the resistive element, when the object is in the negative polarity with respect to the machining electrode.

14. The electric-discharge-machining power supply apparatus according to claim 13, wherein the circuit comprising the MOSFET is connected closer to the machining gap than a wiring feeder coupled in the wiring path between the electric-discharge pulse generating unit and the machining gap.

15. The electric-discharge-machining power supply apparatus according to claim 13, wherein the internal diode in the MOSFET has a short recovery time.

16. The electric-discharge-machining power supply apparatus according to claim 13, wherein a gate voltage of the MOSFET is set such that a resistance value across a source and a drain of the MOSFET enables a small amount of floating capacitance in the machining gap to be charged in a short time when the negative polarity voltage is applied to the object.

17. The electric-discharge-machining power supply apparatus according to claim 13, wherein a gate voltage of the MOSFET is set such that a resistance value across a source and a drain of the MOSFET enables a discharge current to an inter-electrode gap, which discharge current is a sum of an electric discharge current of the charging capacitor and floating capacitance in feeder wiring and detecting wiring, and a current supplied from a DC power supply, when the object is in the negative polarity, to be substantially small compared with the discharge current when the object is in the positive polarity, with respect to the machining electrode.

18. The electric-discharge-machining power supply apparatus according to claim 13, wherein a gate voltage of the MOSFET is set such that a resistance value across a source and a drain of the MOSFET is substantially small compared with input resistances of detector circuits connected in parallel to the electric-discharge pulse generating unit, to perform accurate detection of an inter-electrode state.

* * * * *